United States Patent [19]
Winkler et al.

[11] Patent Number: 4,950,113
[45] Date of Patent: Aug. 21, 1990

[54] MACHINE TOOL

[75] Inventors: Hans-Henning Winkler, Tuttlingen; Eugen Rütschle, Mülheim, both of Fed. Rep. of Germany

[73] Assignee: Chiron-Werke GmbH & Co. KG, Tuttlingen, Fed. Rep. of Germany

[21] Appl. No.: 255,889

[22] Filed: Oct. 11, 1988

[30] Foreign Application Priority Data

Oct. 14, 1987 [DE] Fed. Rep. of Germany ....... 3734716

[51] Int. Cl.[5] ............................................. B23Q 11/08
[52] U.S. Cl. .............................. 409/134; 29/DIG. 56; 29/DIG. 94; 51/270; 82/901; 384/15
[58] Field of Search ................... 409/134, 137; 51/270; 408/67; 82/901; 29/DIG. 56, DIG. 61, DIG. 79, DIG. 94, DIG. 102; 384/15

[56] References Cited

U.S. PATENT DOCUMENTS

| | | | |
|---|---|---|---|
| 1,530,725 | 3/1925 | Johannesmeyer et al. | 29/DIG. 79 |
| 2,634,560 | 4/1953 | Ramm | 29/DIG. 102 |
| 3,366,012 | 1/1968 | Richter | 409/134 |
| 4,676,666 | 6/1987 | Pfluger et al. | 384/15 |

FOREIGN PATENT DOCUMENTS

| | | |
|---|---|---|
| 0077456 | 8/1982 | European Pat. Off. . |
| 2910373 | 3/1979 | Fed. Rep. of Germany . |
| 82016410 | 1/1982 | Fed. Rep. of Germany . |
| 3416429 | 5/1984 | Fed. Rep. of Germany . |
| 2530521 | 3/1983 | France . |

Primary Examiner—Z. R. Bilinsky
Attorney, Agent, or Firm—Rosenblum, Parish & Bacigalupi

[57] ABSTRACT

A machine tool comprises a work table arranged for being displaced in at least one coordinate direction relative to a spindle stock. Longitudinal drive means arranged beneath the work table are covered on both sides of the work table by means of a cover composed of telescoping elements. One of the said elements is provided in stationary arrangement adjacent one side wall of a trough enclosing the cover.

In order to prevent the chips from forming into balls in front of the overlapping elements, when the extreme end position of the work table is reached, at least one opening giving access to the trough is provided on the upside of the one element, at the edge facing the side wall.

5 Claims, 3 Drawing Sheets

MACHINE TOOL

The present invention relates to a machine tool comprising a work table arranged for being displaced in at least one coordinate direction relative to a spindle stock, with longitudinal drive means arranged beneath the work table being covered on both sides of the work table by means of a cover composed of telescoping elements, one of the said elements being provided in stationary arrangement adjacent on side wall of a trough enclosing the cover.

It has been known before in connection with machine tools, in particular in connection with machining centers used for drilling and milling workpieces, to design the machine as so-called long-bed model. These long-bed models comprise a work table which can be displaced over a relatively big length, for example by means of a spindle, a toothed rod and pinion drive, or a toothed belt and gear drive, as described for example by DE-OS 29 10 373.

In order to protect the longitudinal drive means from chips and also from drilling oil splashing around during the machining operation, a telescoping cover is provided on both sides of the displaceable work table. The biggest ones of the telescoping elements are fixed on either side of the work table, while the smallest elements are arranged and fixed in place laterally in the neighborhood of the side walls extending perpendicularly to the longitudinal axis of the long bed. The remaining telescoping elements slide relative to each other during displacement of the work table, and longitudinal stops acting between the elements ensure that the longitudinal drive means are always covered at any time during such movement.

The elements of the cover consist generally of U-shaped sheet-steel parts the upsides of which may in addition be designed in the form of a shed roof. The insides of the elements are provided with lip seals which extend along the U-shaped edges of the elements and which ensure that any chips and drilling oil adhering to the next smaller element are wiped off in the travelling direction and are thus prevented from getting into the space between the elements and from dropping in this manner on the longitudinal drive means.

Given the fact that it is always desirable, in view of the limited space normally available in workshops, to make the design of maching tools as compact as possible it may happen that the smallest element of the cover is arranged directly adjacent the transverse side wall. This means that when the work table reaches an end position in close proximity to the side wall, the elements are in their fully overlapping position and their outer edges are also positioned in the immediate neighborhood of the side wall.

On the other hand, the metal removal rates of modern machining centers are constantly increasing so that very large quantities of chips are to be expected part of which will stay on the surface of the cover.

When the work table is displaced to one extreme end position near the side wall it may happen, under such operating conditions, that the elements of the cover push a large quantity of chips along ahead of them and that, given the confined space in the neighborhood of the side wall, the chips are compressed to a ball when the work table reaches its extreme end position.

However, these conditions are connected with the disadvantage that the lip seals may get damaged by the chips when their ends get trapped in the joints between the elements of the cover.

Now, it is the subject of the present invention to improve a machine tool of the type described above in such a manner that the chips will be safely removed at the lateral edges of the telescoping cover, without any information of balls and, accordingly, withoug any damage to the seals, and this even under cramped conditions.

This object is achieved according to the invention by the fact that at least one opening giving access to the trough is provided on the upside of the one element, at the edge facing the side wall.

This solves the object underlying the present invention fully and perfectly because the overlapping elements of the telescoping cover will push the chips into the area of the opening, shortly before they reach their end position, so that the chips can pass the opening and drop into the trough.

According to a preferred embodiment of the invention, the edge on that side of the opening which faces the other elements extends at a certain angle relative to the coordinate direction.

This feature provides the advantages that the lip seal of the second smallest element will push the chips into the opening over the inclined edge so that sudden stresses and relieving of the stress acting on these lip seals will be avoided.

According to another embodiment of the invention, the element is equipped with two openings which are provided in substantially symmetrical arrangement relative to the coordinate direction and separated by a web.

This feature provides the advantage that the openings do not, or not notably, reduce the stability of the cover.

According to a preferred variant of this embodiment of the invention, the web extends at a certain lateral angle relative to the coordinate direction, the lateral offset being greater than the width of the web.

This feature provides the advantage that no "dead zone" where the chips might form into a ball is formed by the web in the direction of displacement of the work table, as the oblique arrangement of the web ensures that the lip seal of the second smallest element of the cover will move obliquely along the edges of the web and wipe off the whole surface of the web.

Finally, another embodiment of the invention is preferred where each of the openings is arranged substantially on one side of the one element exhibiting the form of a shed roof.

This feature provides the known advantage that by giving the elements of the cover the form of a shed roof one achieves sort of a draining effect towards the sides so that only part of the chips falling upon the cover have to be wiped off by the lips in the travelling direction, during displacement of the work table.

Other advantages of the invention will appear from the following description and the attached drawing.

It is understood that the features that have been mentioned before and will be explained hereafter may be used not only in the described combinations but, also in any other combination or individually, without leaving the scope and intent of the present invention.

Certain embodiments of the invention will now be described in more detail with reference to the drawing in which.

Figure 1:
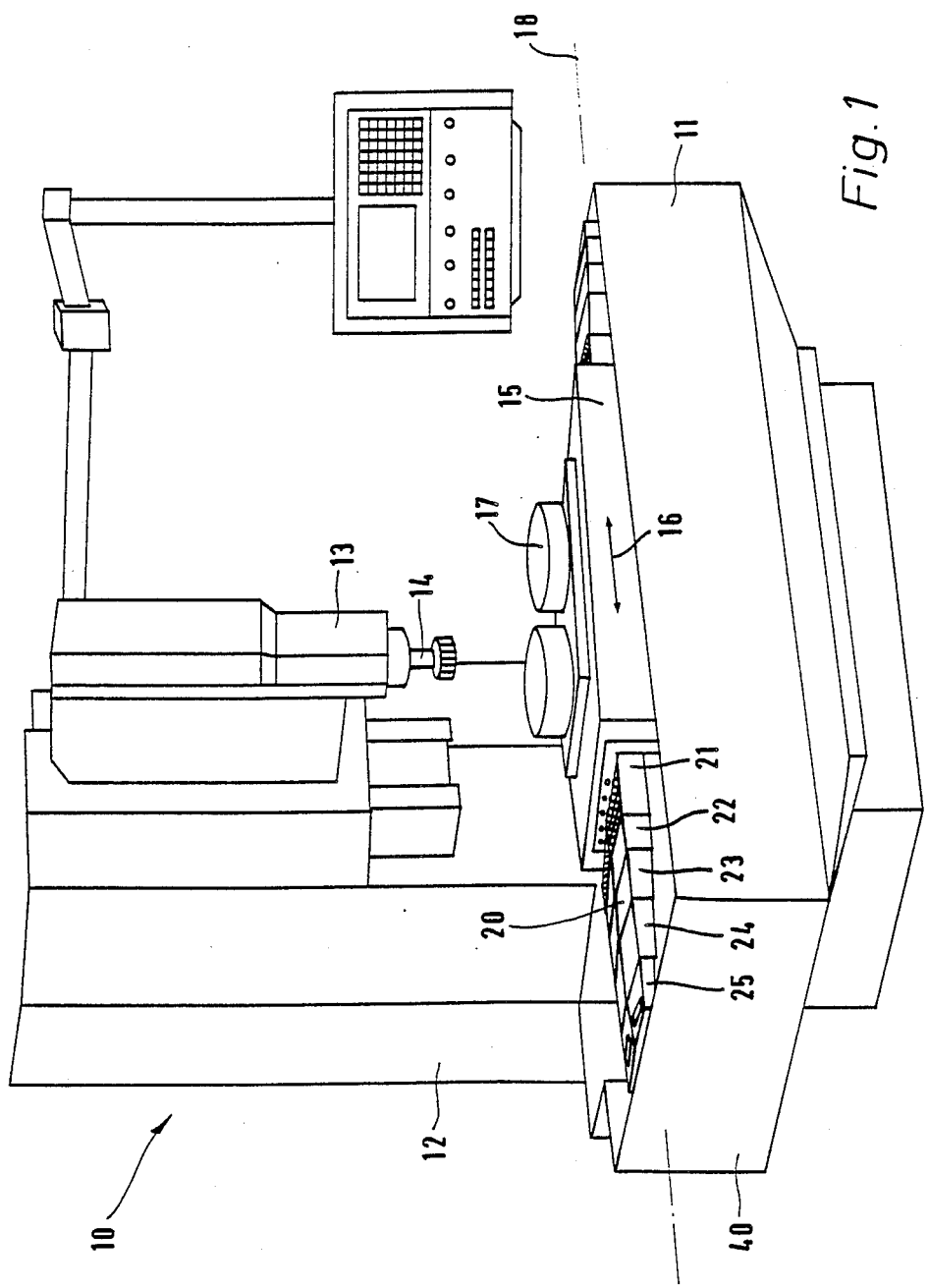
FIG. 1 is a perspective side view of a machine tool designed according to the invention.

Referring now to FIG. 1, reference numeral 10 indicates generally a machine tool, or more precisely a long-bed machining center for drilling and milling workpieces.

The machine tool 10 comprises an elongated machine bed 11 and a spindle stock arranged behind the machine bed 11 and carrying a spindle 13. A tool 14 is mounted in the spindle 13. A work table 15 can be displaced relative to the machine bed 11, in the direction indicated by arrow 16. Workpieces 17 mounted on the work table 15 are arranged for being displaced in the described manner relative to the tool 14, in the direction of a longitudinal axis 18, the so-called x axis.

The details of the displacing mechanisms, their control, and of additional possibilities for the table to travel in other coordinate directions are known as such so that there is no need to describe them in more detail in connection with the present invention.

A linear system arranged beneath the work table 15 and serving for displacing the work table 15 is covered on top by a cover 20 arranged on both sides of the work table 15. The cover 20 consists of telescoping elements 21 to 25 exhibiting substantially the form of sheet-steel parts bent in U shape.

The element 21 arranged immediately adjacent the work table 15 is fixed to the latter. Similarly, the smallest elements 25 are fixed each to one side wall 40 extending perpendicularly to the x axis 18.

Figure 2:
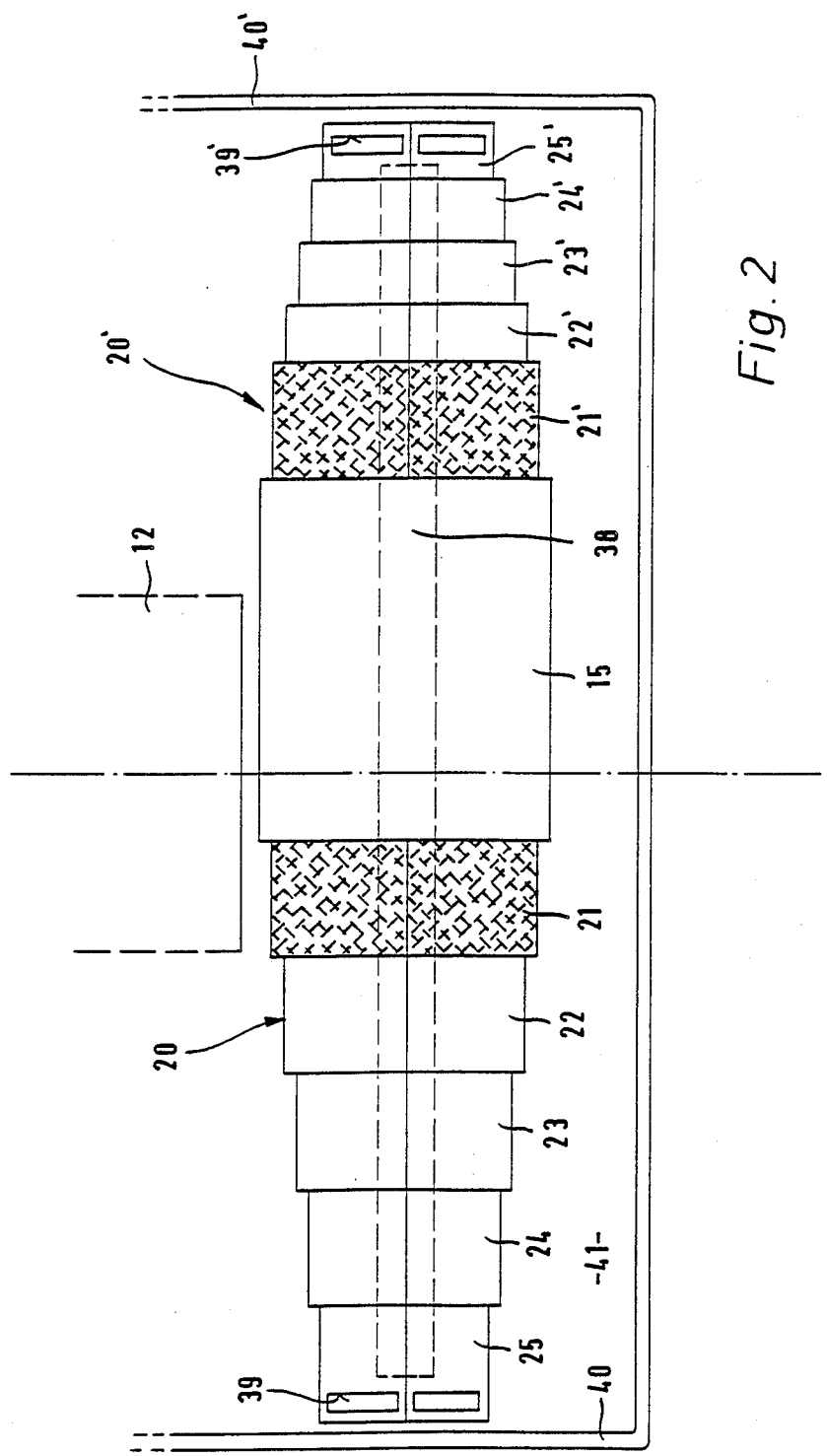
FIG. 2 shows a top view of a telescoping cover of a machine tool according to FIG. 1.

The top view of FIG. 2 shows very clearly that the before-mentioned linear unit, for example a toothed rod 38, a spindle, a toothed belt, or the like, is arranged beneath the work table 15.

The upsides of the smallest elements 25, 25' located in the immediate neighborhood of the side walls 40, 40' are provided with openings 39, 39' arranged near their edges. When the elements 21 to 25 and 21' to 25' are given a shed-roof shape, these openings 39, 39' may be arranged in pairs and symmetrically to the x axis 18.

Figure 3:
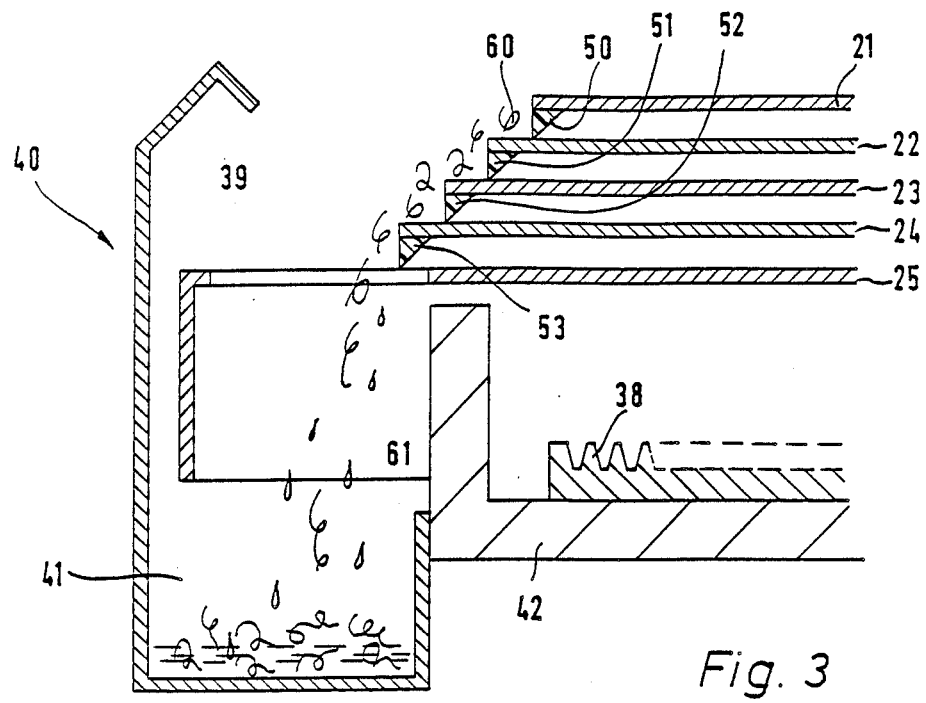
FIG. 3 shows a sectional side view, in enlarged scale, through an end portion of a telescoping cover.

The function of the openings 39 is illustrated clearly by the side view of FIG. 3.

It can be seen in FIG. 3 that the lower end of the side wall 40 forms a trough 41 which may also enclose the work table 50, together with the cover 20, 20', on all sides, as illustrated by FIG. 2.

The trough 41 may adjoin a supporting beam 42 carrying the toothed rod 38.

Each of the moveable elements 21 to 24 of the cover 20 is provided, on its edge opposite the work table 15, with a lip seal to 50 to 53 extending along the U-shaped edge. As can be seen in FIG. 3, these lip seals 50 to 53 have the effect that when the work table 50 and the elements 21 to 24 are displaced, any chips 60 and drilling oil 61 which have not been discharged before into the trough 41, along the sides of the elements 21 to 25, will be wiped off the next smaller element 22 to 25, as the table moves in the travelling direction.

FIG. 3 illustrates the condition where the displaceable elements 21 to 24 have reached a position shortly before the left end position. The lip seal 53 of the second smallest element 24 has already reached the area of the opening 39 so that the chips 60 and the drilling oil 61, which have been wiped off by the lip seals 50 to 53 can drop through the opening 39 and into the trough 41. The chips 60 are prevented in this manner from forming into balls in the area in front of the side walls 40.

Figure 4:
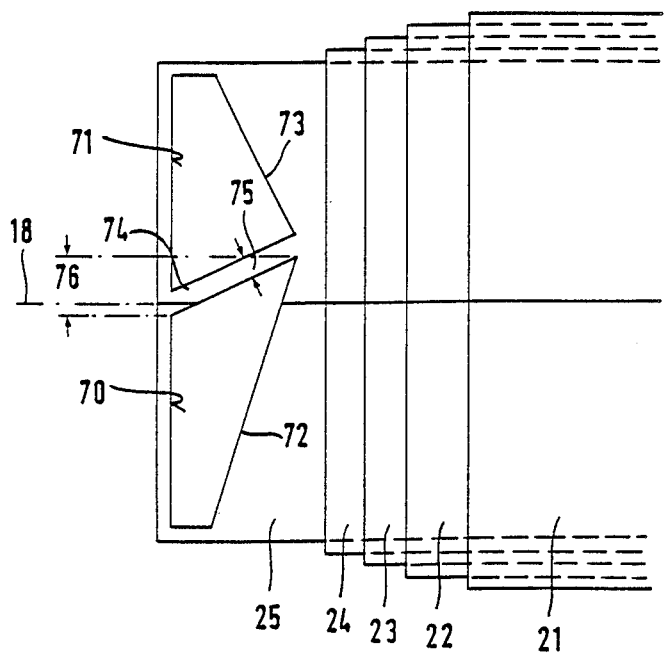
FIG. 4 shows a top view, likewise in enlarged scale, of another embodiment of a cover of a machine tool according to the invention.

FIG. 4 shows another embodiment of the openings 70, 71, which prevents the seals, in particular the seal 53 of the second smallest element 24, from being subjected to sudden stresses, and which also avoids any "dead zones" where the chips might be pressed against the side wall 40.

This is achieved firstly by the fact that the openings 70, 71 are provided with oblique edges 72, 73 on their sides facing the displaceable elements 21 to 42. This arrangement of the edges 72, 73 has the effect that the seal 53 of the second smallest element 24 slides across these edges 72, 73 by a "drawing" movement whereby the chips 60 are wiped off gradually into the openings 70, 71. The seal 53 is thereby protected from the sudden formation and relief of stresses, as the seal passes the openings 70 and 71 in forward and backward direction.

If it is felt desirable, with a view to giving the cover 20 greater stability, to provide two openings 39 or 70, 71 in substantially symmetrical arrangement relative to the x axis, it may happen in the case of the arrangement illustrated by FIG. 2 that a certain residual quantity of chips 60 accumulates in the area of the web between the openings 39 extending along the x axis 18, and is in this manner prevented from entering the openings 39.

In order to avoid this condition, a web 74 can be arranged at an angle relative to the x axis, as illustrated in FIG. 4. The width 75 of the web 74 has been selected in this case to be smaller than the angular offset 76 so that when the seal 53 of the second smallest element 24 moves across the web all chips 60, which initially may have been pushed on to the web 74, are safely wiped off into the opening 71 as the element 24 continues its movement.

It is understood that the shapes of the openings illustrated in the drawings are not meant to limit the invention, but that other shapes, in particular non-straight edges, for example elliptical, circular or other shapes are possible, too, without leaving the scope and intent of the present invention.

We claim:

1. A machine tool, comprising:
    a base member;
    a pair of first, elongate guide elements fixedly attached to said base member, and defining an axis;
    a carriage having second guide elements running on said first, elongate guide elements;
    drive means for displacing said carriage along said first, elongate guide means;
    telescopic cover means arranged above said first, elongate guide means, said cover means having a first cover element attached to said base member, a second cover element attached to said carriage, and a number of intermediate cover members arranged therebetween, said second and said intermediate cover elements being axially displaceable with respect to each other and with respect to said first cover element;
    a chip container arranged on said base member and surrounding said first elongate guide elements and said telescopic cover means;
    an opening arranged in said first cover element and giving access to said chip container, arranged thereunder, said opening extending substantially perpendicular to said axis and spanning substantially spanning said first cover element.

2. The machine tool of claim 1, wherein an edge on a radial side of said opening facing one of said intermediate cover elements extends inwardly at an acute angle relative to said axis.

3. The machine tool of claim 1, wherein said first cover element is provided with two openings being arranged in essentially symmethrical arrangement relative to said axis and being separated by a web.

4. The machine tool of claim 3, wherein said web extends at a certain angle relative to said axis, said web having a predetermined width and a first and a second axial terminal, a radial offset of said axial terminals being greater than said width.

5. The machine tool of claim 3, wherein each of said openings being arranged symmetrically to said axis exhibiting essentially a shed roof contour.

* * * * *